(12) United States Patent
Wolck et al.

(10) Patent No.: US 12,017,515 B2
(45) Date of Patent: Jun. 25, 2024

(54) VEHICLE WINDOW SUBASSEMBLIES FOR INITIAL BONDED AND SUBSEQUENT ROPED INSTALLATION

(71) Applicant: Volvo Truck Corporation, Gothenburg (SE)

(72) Inventors: Daniel Wolck, Madison, NC (US); Ganesh Apparsundaram, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 59 days.

(21) Appl. No.: 17/777,399

(22) PCT Filed: Jan. 23, 2020

(86) PCT No.: PCT/US2020/014795
§ 371 (c)(1),
(2) Date: May 17, 2022

(87) PCT Pub. No.: WO2021/150228
PCT Pub. Date: Jul. 29, 2021

(65) Prior Publication Data
US 2022/0402341 A1 Dec. 22, 2022

(51) Int. Cl.
*B60J 1/00* (2006.01)
*B60J 10/273* (2016.01)
(Continued)

(52) U.S. Cl.
CPC .............. *B60J 1/004* (2013.01); *B60J 1/006* (2013.01); *B60J 10/273* (2016.02); *B60J 10/70* (2016.02); *B60R 13/04* (2013.01)

(58) Field of Classification Search
CPC . B60J 10/70; B60J 10/273; B60J 1/006; B60J 1/004
See application file for complete search history.

(56) References Cited

U.S. PATENT DOCUMENTS 3,672,109 A * 6/1972 Erck .................. B60J 10/34
52/204.597
4,765,673 A * 8/1988 Frabotta ................ B60J 10/70
52/716.5
(Continued)

FOREIGN PATENT DOCUMENTS

DE 19539960 A1 4/1997
EP 0795431 A1 9/1997
(Continued)

OTHER PUBLICATIONS

Machine translation of WO2007/051942, printed from the EPO website, Oct. 2, 2023.*
(Continued)

*Primary Examiner* — Jason S Morrow
(74) *Attorney, Agent, or Firm* — Withrow & Terranova, PLLC

(57) ABSTRACT

Vehicle window subassemblies for initial bonded and subsequent roped installation are provided. In certain embodiments, a vehicle body of a vehicle includes a window mount with a flange having a bonding space for bonded installation of a window and a replacement space for roped installation of a replacement window. A bonded window subassembly includes a window, bonding agent, and bonded window trim configured to, upon attachment of the window to the window mount, preserve the replacement space from the bonding agent for roped installation of a replacement window. A roped window subassembly includes a replacement window and a roped window trim configured to, upon attachment of the window to the window mount, create a seal in the replacement space and not create a seal in the bonding space. Such configurations provide increased quality of an initial bonded installation and reduced cost of a roped installation.

17 Claims, 4 Drawing Sheets

(51) Int. Cl.
*B60J 10/70* (2016.01)
*B60R 13/04* (2006.01)

(56) References Cited

U.S. PATENT DOCUMENTS

| | | | | |
|---|---|---|---|---|
| 4,833,847 A * | 5/1989 | Inayama | ............... | B60J 10/70 |
| | | | | 52/204.597 |
| 5,114,206 A | 5/1992 | Yada | | |
| 5,273,338 A * | 12/1993 | Gooding | ............... | B60J 10/248 |
| | | | | 52/204.597 |
| 5,584,526 A * | 12/1996 | Soldner | ............... | B60J 10/265 |
| | | | | 52/204.591 |
| 5,935,356 A * | 8/1999 | Soldner | ............... | B60J 10/30 |
| | | | | 296/93 |
| 6,000,747 A | 12/1999 | Sehgal et al. | | |
| 6,017,038 A * | 1/2000 | Wato | ............... | B60J 10/70 |
| | | | | 277/630 |
| 6,095,586 A * | 8/2000 | Yada | ............... | B29C 48/12 |
| | | | | 52/204.597 |
| 6,134,851 A | 10/2000 | Roze et al. | | |
| 6,196,615 B1 * | 3/2001 | Yada | ............... | B60J 10/34 |
| | | | | 296/93 |
| 6,227,598 B1 * | 5/2001 | Ichioka | ............... | B60J 10/16 |
| | | | | 296/93 |
| 6,238,769 B1 * | 5/2001 | Nishio | ............... | B60J 1/02 |
| | | | | 49/490.1 |
| 6,810,635 B2 * | 11/2004 | Meizlish | ............... | B60J 10/35 |
| | | | | 52/716.5 |
| 7,059,656 B2 * | 6/2006 | Mikkaichi | ............... | B60J 10/16 |
| | | | | 52/204.597 |
| 7,073,842 B2 * | 7/2006 | Kagawa | ............... | B60J 10/70 |
| | | | | 52/204.597 |
| 9,216,635 B2 * | 12/2015 | Medina | ............... | B60J 1/004 |
| 9,944,157 B2 * | 4/2018 | Moriyama | ............... | B60J 10/345 |
| 10,183,635 B2 * | 1/2019 | Tsutsumi | ............... | B60J 1/02 |
| 10,843,639 B2 * | 11/2020 | Morishita | ............... | B60J 10/70 |
| 2005/0006922 A1 | 1/2005 | Mikkaichi et al. | | |
| 2005/0104406 A1 * | 5/2005 | Pennerath | ............... | B60J 10/70 |
| | | | | 296/93 |
| 2014/0265422 A1 | 9/2014 | Medina et al. | | |
| 2019/0284362 A1 * | 9/2019 | Morishita | ............... | C08L 23/04 |
| 2022/0324300 A1 * | 10/2022 | Takahashi | ............... | B60J 1/006 |

FOREIGN PATENT DOCUMENTS

| | | | | |
|---|---|---|---|---|
| KR | 19990024381 U | 7/1999 | | |
| WO | WO-2007051942 A1 * | 5/2007 | ............. | B60J 10/70 |

OTHER PUBLICATIONS

Invitation to Pay Additional Fees for International Patent Application No. PCT/US2020/014795, mailed Mar. 26, 2020, 2 pages.
International Search Report and Written Opinion for International Patent Application No. PCT/US2020/014795, mailed May 22, 2020, 10 pages.
International Preliminary Report on Patentability for International Patent Application No. PCT/US2020/014795, mailed Nov. 19, 2021, 21 pages.
Partial Supplementary European Search Report for European Patent Application No. 20914776.8, mailed Sep. 11, 2023, 12 pages.
Extended European Search Report for European Patent Application No. 20914776.8, mailed Mar. 21, 2024, 13 pages.

* cited by examiner

VEHICLE WINDOW SUBASSEMBLIES FOR INITIAL BONDED AND SUBSEQUENT ROPED INSTALLATION

This application is a 35 USC 371 national phase filing of International Application No. PCT/US2020/014795, filed Jan. 23, 2020, the disclosure of which is incorporated herein by reference in its entirety.

FIELD OF THE DISCLOSURE

The disclosure relates generally to window subassemblies. In particular aspects, the disclosure relates to vehicles and vehicle window subassemblies for bonded installation of an initial window subassembly and subsequent roped installation of a replacement window subassembly.

BACKGROUND

Vehicle window subassemblies, such as for heavy truck vehicles, require initial installation and occasionally require subsequent replacement (e.g., due to an accident, being hit by a rock, etc.). For initial installation, a bonded window subassembly is generally preferred, as factory installation is easier and cheaper with direct bonding. However, for subsequent replacement window installation, a roped window subassembly is generally preferred for ease of aftermarket replacement. However, a vehicle body (e.g., body in white (BIW)) is typically configured only for one of these types of window subassemblies. Installing an aftermarket roped window subassembly on a vehicle body that previously had a bonded window subassembly is typically difficult as the residual bonding agent obstructs the sealing surface and compromises the seal. Further, removal of the bonding agent (e.g., by chemical means, mechanical means, etc.) can damage the paint, lead to rust, etc.

SUMMARY

According to an aspect of the disclosure, a window subassembly for a vehicle includes a window, a bonding agent, and a bonded window trim. The bonding agent is attached to an internal surface of the window and proximate to an edge of the window. The bonding agent is configured to attach the window to a window mount of a vehicle. The bonded window trim is engaged with the edge of the window, and has an external portion contacting an external surface of the window and an internal portion contacting the internal surface of the window. The bonded window trim is configured to, upon attachment of the window to the window mount, preserve a replacement space of the window mount for roped installation of a replacement window by keeping the space clear of bonding agent.

In certain embodiments, the bonded window trim includes a bonded trim lip extending away from the internal surface of the window to contact the window mount before the bonding agent spreads to the replacement space upon attachment of the window to the window mount.

In certain embodiments, the bonded window trim comprises a bonded trim lip configured to deform upon attachment of the window to the window mount to preserve the replacement space.

In certain embodiments, the bonded trim lip is resilient and extends away from the internal surface of the window.

In certain embodiments, the internal portion of the bonded window trim includes a spacing length configured to preserve the replacement space.

In certain embodiments, the bonded window trim is configured to preserve the replacement space having a length between 5-15 mm.

In certain embodiments, the bonding agent comprises a pyramidal shape having a base between 5-15 mm and a height between 5-15 mm.

According to another aspect of the disclosure, a window subassembly for a vehicle includes a window and a roped window trim. The roped window trim is engaged with an edge of the window. The roped window trim has an external portion contacting an external surface of the window, an intermediate portion contacting an internal surface of the window, and an internal portion configured to contact an internal surface of a window mount. The roped window trim is configured to, upon attachment of the window to the window mount, create a seal in a replacement space of the window mount and not create a seal in a bonding space of the window mount.

In certain embodiments, the roped window trim includes a roped trim lip extending away from the internal surface of the window to contact the window mount to create a seal between the roped window trim and the window mount upon attachment of the window to the window mount.

In certain embodiments, the roped window trim includes a roped trim lip configured to deform upon attachment of the window to the window mount to create a seal between the roped window trim and the window mount.

In certain embodiments, the roped trim lip is resilient and extends away from the internal surface of the window.

In certain embodiments, the roped window trim defines a recess between the roped trim lip and an inward edge of the intermediate portion to create a gap between the window mount and the intermediate portion of the roped window trim upon attachment of the window to the window mount.

In certain embodiments, the gap is larger than 1 mm to avoid contact with any residual bonding agent, the residual bonding agent being less than 1 mm thick.

In certain embodiments, the roped window trim is configured to, upon attachment of the window to the window mount, create a seal in a replacement space of the window mount and not create a seal in a bonding space of the window mount, wherein the replacement space is outward from the bonding space.

In certain embodiments, the replacement space is between 5-15 mm wide.

According to another aspect of the disclosure, a vehicle includes a vehicle body including a window mount with a flange. The flange includes a bonding space and a replacement space. The bonding space is configured for bonded installation of a window, and the replacement space is configured for roped installation of a replacement window.

In certain embodiments, the flange has a length between 25-35 mm.

In certain embodiments, the bonding space and the replacement space each have a length between 5-15 mm.

In certain embodiments, the vehicle further includes a window subassembly. The window subassembly includes the window, a bonding agent, and a bonded window trim. The bonding agent is attached to an internal surface of the window and proximate to an edge of the window. The bonding agent attaches the window to the window mount. The bonded window trim is engaged with an edge of the window. The bonded window trim has an external portion contacting an external surface of the window and an internal portion contacting an internal surface of the window. The bonded window trim preserves the replacement space of the window mount from the bonding agent for roped installation of the replacement window.

In certain embodiments, the vehicle further comprises a window subassembly. The window subassembly includes the window and a roped window trim. The roped window trim is engaged with an edge of the window. The roped window trim has an external portion contacting an external surface of the window, an intermediate portion contacting an internal surface of the window, and an internal portion configured to contact an internal surface of the window mount. The roped window trim creates a seal in the replacement space of the window mount and does not create a seal in the bonding space of the window mount.

Additional features and advantages will be set forth in the detailed description which follows, and in part will be readily apparent from that description to those skilled in the art or recognized by practicing the embodiments as described herein, including the detailed description which follows, the claims, as well as the appended drawings.

It is to be understood that both the foregoing general description and the following detailed description are merely exemplary, and are intended to provide an overview or framework for understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
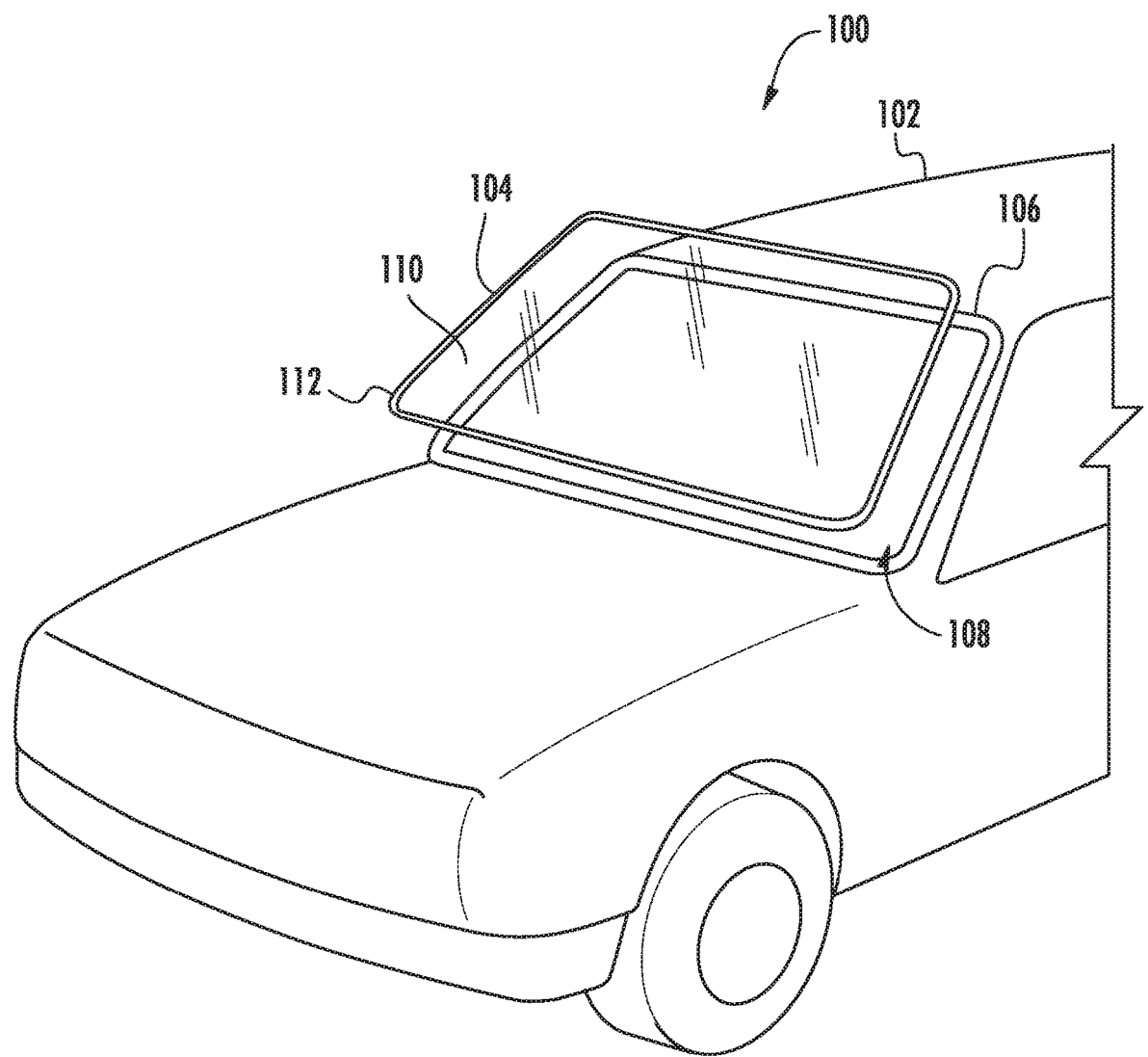
FIG. 1 is a perspective exploded view of a vehicle including a vehicle body and a window subassembly.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 is a perspective exploded view of a vehicle 100 including a vehicle body 102 (e.g., body in white (BIW)) and a window subassembly 104. The vehicle body 102 includes a window mount 106 defining and extending around a window aperture 108. The window mount 106 is configured for mounting the window subassembly 104 to the vehicle body 102. It is noted that although the vehicle 100 is embodied as a car, the invention may be used on any other type of vehicle (e.g., truck). Further, the window mount 106 and window subassembly 104 are configured as a front windshield, but the window mount 106 and/or window subassembly 104 could also be used for any other window of the vehicle 100.

The window subassembly 104 includes a window 110 and a trim 112 (may also be referred to as a seal member, rubber seal, etc.) around a peripheral edge of the window 110. The trim 112 is configured to form a seal (e.g., watertight) around a periphery of the window 110 between the window 110 and the window mount 106 to prevent water from entering the interior of the vehicle body 102.

As discussed in more detail below, there are generally two types of window subassemblies 104. One type is a bonded window subassembly which is bonded to the window mount 106 by a bonding agent, which is generally preferred for initial factory installation. Another type is a roped window assembly, which is mounted to the window mount 106 by mechanical application of the trim 112, which is generally preferred for ease of aftermarket replacement. The vehicle body 102 and/or window subassembly 104 are configured to allow for initial application of a bonded window subassembly and subsequent replacement by a roped window subassembly, while also avoiding any residual bonding agent that may obstruct the sealing surface and/or compromise the seal.

Figure 2A:
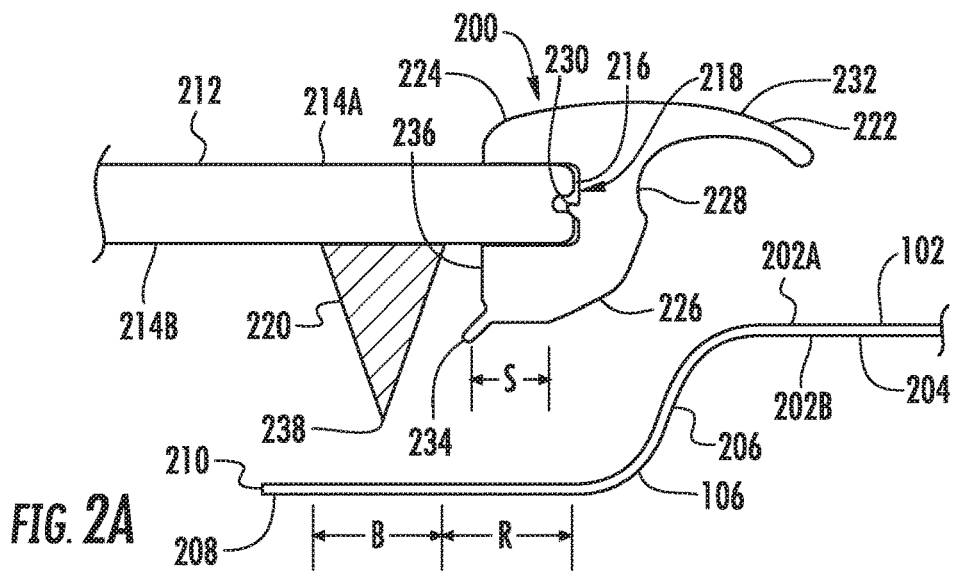
FIG. 2A is a cross-sectional side view of initial installation of a bonded window subassembly to a window mount of a vehicle body illustrating positioning of a bonding agent separated from a flange of the vehicle body.
Figure 2B:
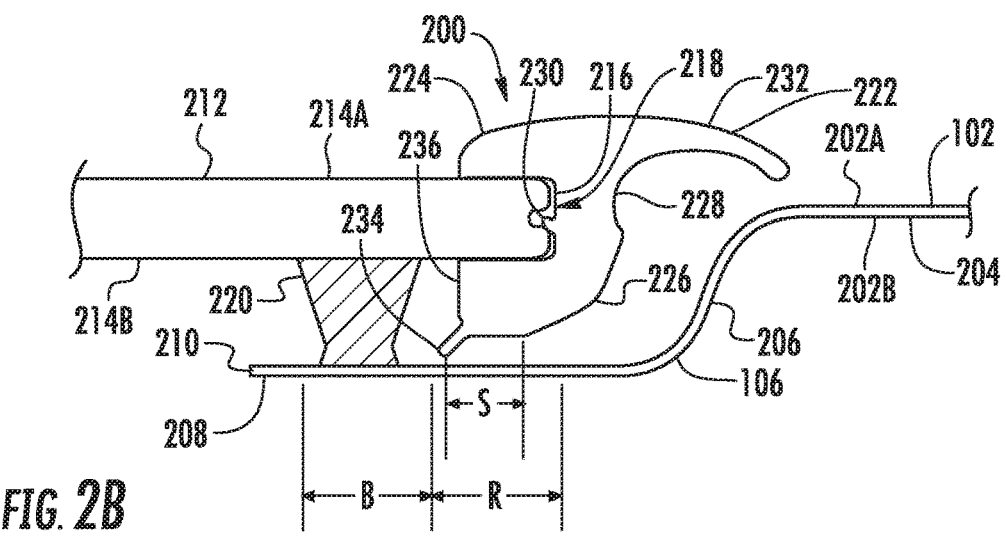
FIG. 2B is a cross-sectional side view of the initial installation of the bonded window subassembly of FIG. 2A illustrating partial application of the bonding agent to the flange of the vehicle body.
Figure 2C:
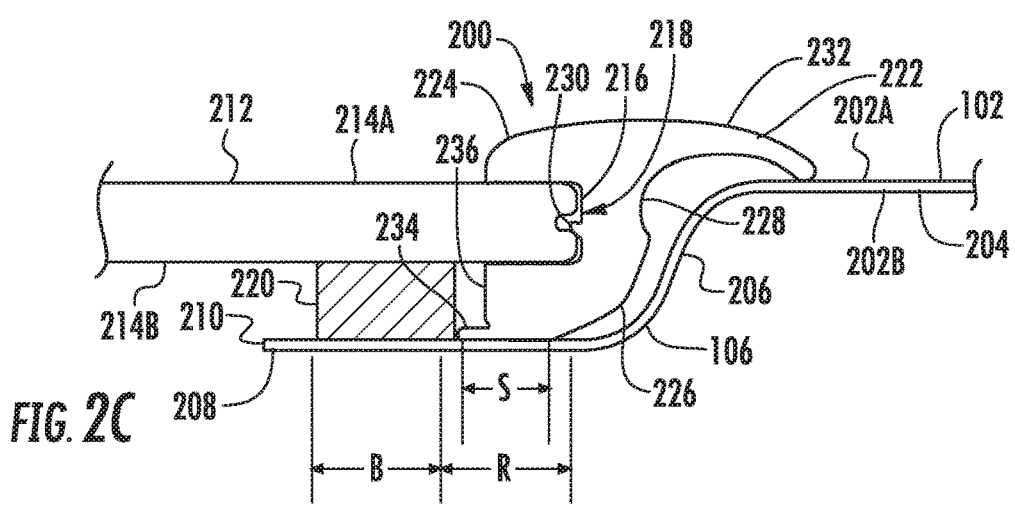
FIG. 2C is a cross-sectional side view of the initial installation of the bonded window subassembly of FIG. 2A illustrating full application of the bonding agent to the flange of the vehicle body.

FIGS. 2A-2C are views of initial installation (e.g., factory installation) of a bonded window subassembly 200 to a window mount 106 of a vehicle body 102. The vehicle body 102 includes an external surface 202A and an internal surface 202B. Further, the vehicle body 102 includes a body portion 204 and a window mount 106. The window mount 106 includes an intermediate wall 206 and a flange 208. The flange 208 is attached to and offset from the body portion 204 by the intermediate wall 206. The flange 208 includes an inward peripheral edge 210 which defines the window aperture 108.

The flange 208 includes a bonding space B and a replacement space R. In certain embodiments, the bonding space B is proximate to the inward peripheral edge 210, and the replacement space R is proximate to the intermediate wall 206. The bonding space B is configured for bonded installation of a window, and the replacement space R is configured for roped installation of a replacement window. In certain embodiments, the flange 208 has a length between 25-35 mm. In certain embodiments, the bonding space B and the replacement space R each have a length between 5-15 mm.

The bonded window subassembly 200 includes a bonded window 212 having an external surface 214A and an internal surface 214B. In certain embodiments, the bonded window 212 includes a peripheral edge 216 and a groove 218 defined by the peripheral edge 216 and at least partially extending around the bonded window 212. The bonded window subassembly 200 further includes a bonding agent 220 at the internal surface 214B and proximate to the peripheral edge 216 of the bonded window 212. The bonding agent 220 is configured to attach the bonded window 212 to the window mount 106 of the vehicle 100.

The bonded window subassembly 200 further includes a bonded window trim 222 engaged with and extending around the peripheral edge 216 of the bonded window 212. The bonded window trim 222 is configured to, upon attachment of the bonded window 212 to the window mount 106, preserve (e.g., protect) a replacement space of the window mount 106 from the bonding agent 220 for roped installation of a replacement window.

The bonded window trim 222 includes an external portion 224 contacting the external surface 214A of the bonded window 212, an internal portion 226 contacting the internal surface 214B of the bonded window 212, and an outer wall portion 228 contacting the peripheral edge 216 of the bonded window 212. The external portion 224 and the internal portion 226 are connected to one another by the outer wall portion 228. The bonded window 212 is positioned between the external portion 224 and the internal portion 226. Further, the outer wall portion 228 includes an inwardly extending ridge 230 positioned within the groove 218 to further secure the bonded window trim 222 to the bonded window 212.

In certain embodiments, the bonded window trim 222 further includes a flap 232 outwardly extending over the intermediate wall 206 of the window mount 106 and configured to contact the external surface 202A of the vehicle body 102 to provide a seamless aesthetic. The bonded window trim 222 further includes a bonded trim lip 234 extending away from the internal surface 214B of the bonded window 212 (e.g., downwardly extending) and configured to contact the window mount 106. The bonded trim lip 234 is at a bottom of the internal portion 226 and at an internal edge 236 of the internal portion 226 of the bonded window trim 222.

FIG. 2A illustrates positioning of a bonding agent 220 before bonding the window subassembly 200 to a flange 208 of the vehicle body 102. The bonding agent 220 has a pyramidal shape having a base between 5-15 mm and a height between 5-15 mm. The tip 238 of the bonding agent 220 is separated from the flange 208.

FIG. 2B illustrates partial application of the bonding agent 220 to the flange 208 of the vehicle body 102. Upon contact of the tip 238 and exertion of pressure, the bonding agent 220 starts to deform, such that the bonding agent 220 spreads outwardly. Accordingly, the pyramidal shape of the bonding agent 220 ensures a contact surface area and even application of the bonding agent 220 to the flange 208.

The bonded trim lip 234 extends away from the internal surface 214B of the bonded window 212 and is configured to contact the window mount 106 before the bonding agent 220 spreads to the replacement space R upon attachment of the bonded window 212 to the window mount 106. Accordingly, the bonded trim lip 234 forms an initial dam that prevents the bonding agent 220 from spreading underneath the bonded window trim 222 (i.e., between the bonded window trim 222 and the flange 208).

FIG. 2C illustrates full application of the bonding agent 220 to the flange 208 of the vehicle body 102. Upon full application, the bonding agent 220 spreads up to, but not past, the bonded trim lip 234. The bonded trim lip 234 is resilient such that the bonded trim lip 234 deforms (e.g., elastically deforms), thereby allowing the internal portion 226 of the bonded window trim 222 to contact the flange 208 and form a seal therebetween. In other words, the bonded trim lip 234 is configured to deform upon attachment of the bonded window 212 to the window mount 106 to preserve the replacement space R. Accordingly, for example, fluid (e.g., liquid, air, water, etc.) cannot flow past the seal into an interior of the vehicle 100.

The bonded trim lip 234 and/or internal portion 226 preserve the replacement space R from the bonding agent 220. In certain embodiments, the internal portion 226 of the bonded window trim 222 has a spacing length S configured to preserve the replacement space R. In certain embodiments, the spacing length S includes the bonded trim lip 234. In other embodiments, the spacing length S excludes the bonded trim lip 234. In certain embodiments, the spacing length S of the internal portion is less than the replacement space R of the flange 208. In certain embodiments, the bonded window trim 222 is configured to preserve the replacement space R having a length between 5-15 mm wide. This replacement space R provides a sealing surface for a subsequent roped window subassembly.

Figure 3:
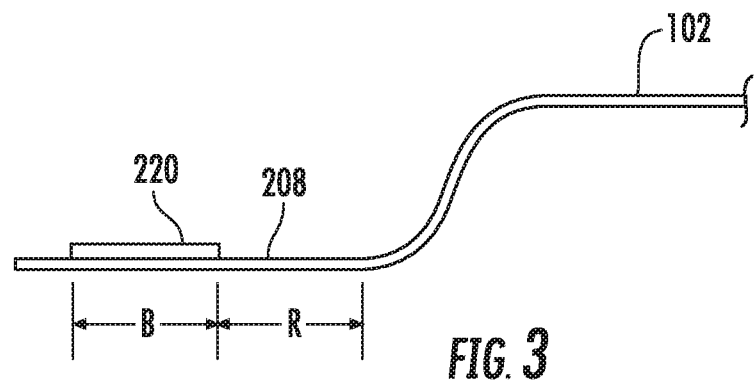
FIG. 3 is a cross-sectional side view of the flange of the vehicle body of FIGS. 2A-2C after removal of the bonded window subassembly.

FIG. 3 is a cross-sectional side view of the flange 208 of the vehicle body 102 after removal of the bonded window subassembly 200 (see FIGS. 2A-2C). Upon removal of the bonded window subassembly 200, the bonding agent 220 can be trimmed down (e.g., to a thickness of 1-2 mm).

Figure 4A:
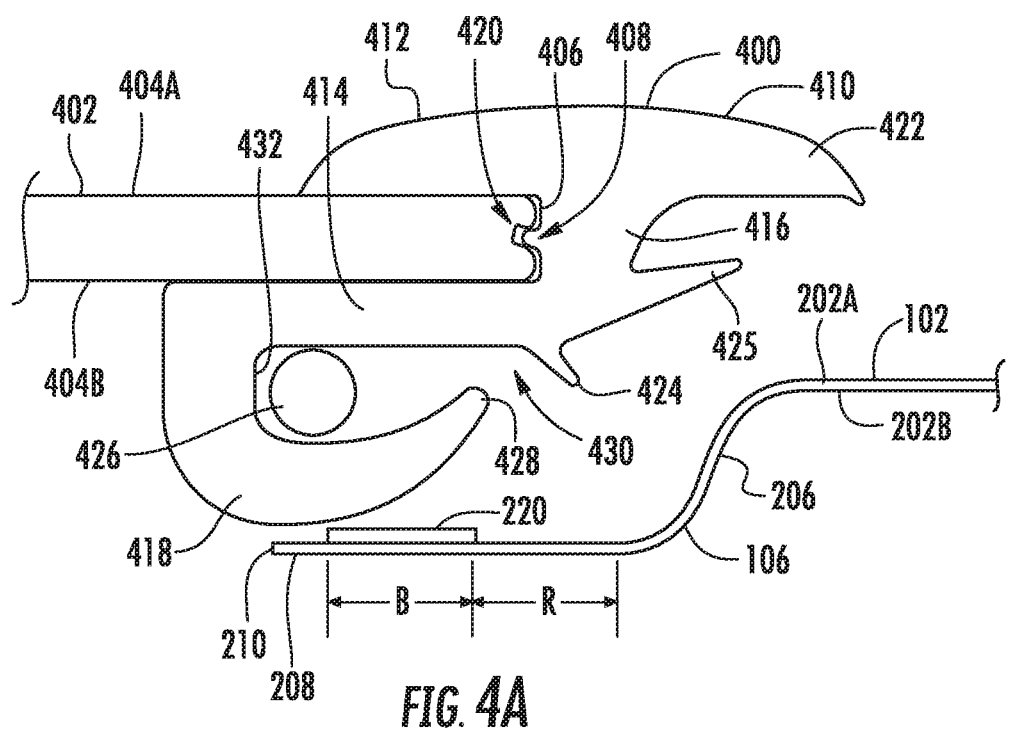
FIG. 4A is a cross-sectional side view of subsequent roped installation of a roped window subassembly to a window mount of the vehicle body of FIGS. 2A-3 illustrating positioning of a roped window trim separated from the flange of the vehicle body.
Figure 4B:
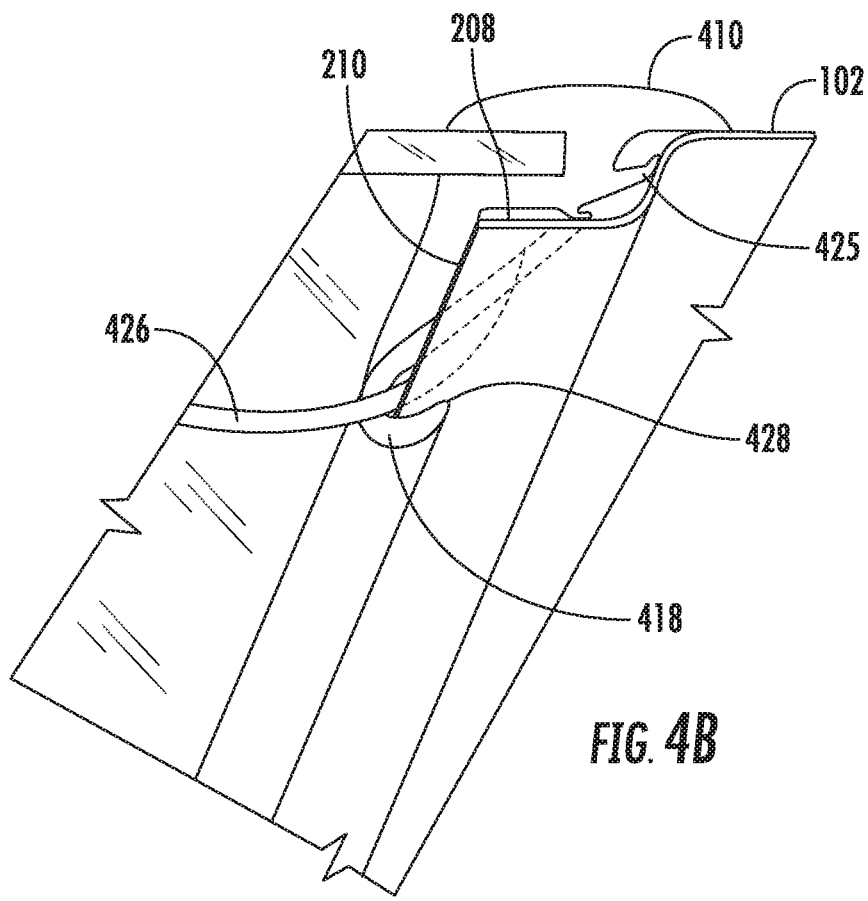
FIG. 4B is a cross-sectional side view of the subsequent roped installation of the roped window subassembly of FIG. 4A illustrating partial application of the roped window trim to the flange of the vehicle body.
Figure 4C:
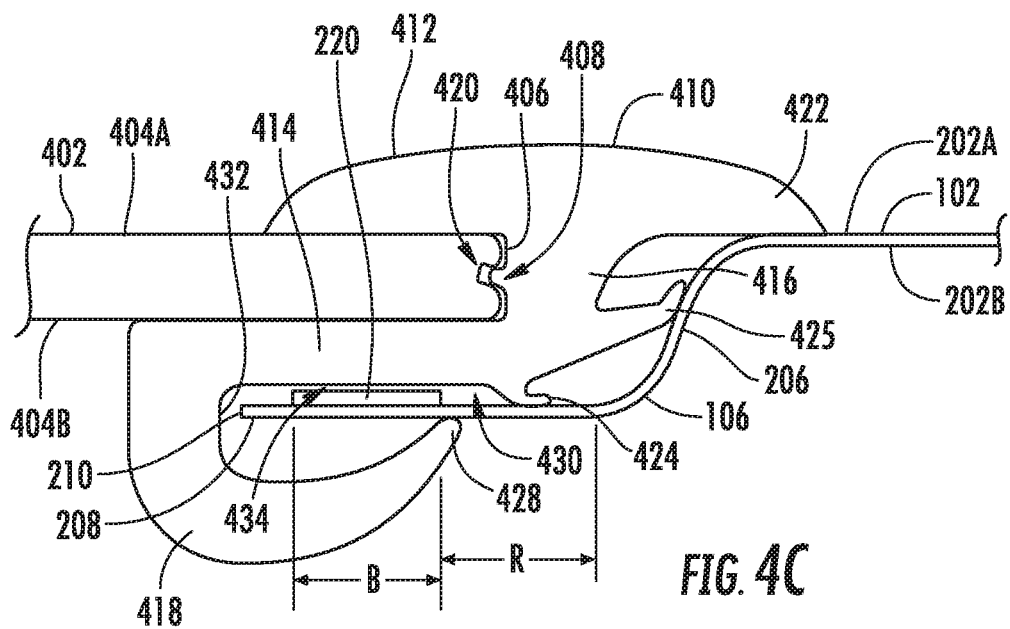
FIG. 4C is cross-sectional side view of the subsequent roped installation of the roped window subassembly of FIG. 4A illustrating full application of the roped window trim to the flange of the vehicle body.

FIGS. 4A-4C are views of replacement installation of a roped window subassembly 400 to the window mount 106 of the vehicle body 102. The roped window subassembly 400 includes a roped window 402 having an external surface 404A and an internal surface 404B. In certain embodiments, the roped window 402 includes a peripheral edge 406 and a groove 408 defined by the peripheral edge 406 at least partially extending around the roped window 402. The roped window subassembly 400 further includes a roped window trim 410 engaged with and extending around the peripheral edge 406 of the roped window 402.

The roped window trim 410 includes an external portion 412 contacting the external surface 404A of the roped window 402, an intermediate portion 414 contacting the internal surface 404B of the roped window 402, an outer wall portion 416 contacting the peripheral edge 406 of the roped window 402, and an internal portion 418 configured to contact the internal surface 202B of the flange 208 of the window mount. The external portion 412 and the intermediate portion 414 are connected to one another by the outer wall portion 416 at an outer edge of the intermediate portion 414 proximate to the peripheral edge 406. The roped window 402 is positioned between the external portion 412 and the intermediate portion 414. Further, the outer wall portion 416 includes an inwardly extending ridge 420 positioned within the groove 408 to further secure the roped window trim 410 to the roped window 402.

In certain embodiments, the roped window trim 410 further includes a flap 422 outwardly extending over the intermediate wall 206 of the window mount 106 and configured to contact the external surface 202A of the vehicle body 102 to provide a seamless aesthetic.

The roped window trim 410 further includes a roped trim lip 424 (may also be referred to as a seal lip) extending away from the internal surface 404B of the roped window 402 (e.g., downwardly extending) and configured to contact the window mount 106. The roped trim lip 424 is at a bottom of the internal portion 418 and proximate to the outer wall portion 416.

In certain embodiments, the roped window trim 410 further includes a biasing skirt 425 (may also be referred to as a biasing lip) extending away from a peripheral edge 406 of the roped window 402 and configured to contact the intermediate wall 206. The biasing skirt 425 provides stability to the roped window 402 and helps center the roped window 402 in the window mount 106.

The intermediate portion 414 and the internal portion 418 are connected to one another at an inner edge of the intermediate portion 414. The internal portion 418 hooks upwardly toward the peripheral edge 406 of the roped window 402. Further, in certain embodiments, the roped window subassembly 400 includes rope 426 positioned between the internal portion 418 and the intermediate portion 414.

FIG. 4A illustrates positioning of a roped window trim 410 separated from the flange 208 of the vehicle body 102. The roped window subassembly 400 includes rope 426 positioned between the internal portion 418 and the intermediate portion 414.

FIG. 4B illustrates partial application of the roped window trim 410 to the flange 208 of the vehicle body 102. The rope 426 is drawn from the roped window trim 410 to pull an end 428 of the internal portion 418 outward around the inward peripheral edge 210 of the flange 208. The internal portion 418 is resilient and/or elastically deformable, such that it can be drawn outward and then return to its original orientation in order to engage the flange 208.

FIG. 4C illustrates full application of the roped window trim 410 to the flange 208 of the vehicle body 102. By withdrawing the rope 426, the flange 208 is now positioned between the intermediate portion 414 and the internal portion 418. The internal portion 418 and/or the roped trim lip 424 are resilient and configured to deform in order to hold the flange 208 between the internal portion 418 and/or the roped trim lip 424.

The roped trim lip 424 forms a seal against the flange 208 in the replacement space R. The replacement space R does not include any of the bonding agent 220. In other words, the roped window trim 410 includes the roped trim lip 424 extending away from the internal surface 202B of the roped window 402 to contact the window mount 106 to create a seal between the roped window trim 410 and the window mount 106 upon attachment of the window to the window mount 106. Further, the roped trim lip 424 is configured to deform upon attachment of the roped window 402 to the window mount 106 to create a seal between the roped window trim 410 and the window mount 106. Accordingly, for example, fluid (e.g., liquid, air, water, etc.) cannot flow past the seal into an interior of the vehicle 100.

The roped window trim 410 defines a recess 430 between the roped trim lip 424 and an inward edge 432 of the intermediate portion 414 to create a gap 434 between the window mount 106 and the intermediate portion 414 of the roped window trim 410 upon attachment of the roped window 402 to the window mount 106. In particular, the roped window trim 410 forms a gap 434 between the intermediate portion 414 and the bonding agent 220. Thus, the roped window trim 410 is configured to clear the residual bonding agent 220 without interference. In certain embodiments, the gap 434 is larger than 1 mm to avoid contact with any residual bonding agent 220 (e.g., less than 1 mm thick). Avoiding contact with the bonding agent 220 prevents potential problems in forming the seal in the replacement space R.

The roped window trim 410 is configured to, upon attachment of the roped window 402 to the window mount 106, create a seal in the replacement space R of the window mount 106 and not create a seal in a bonding space B of the window mount 106. In certain embodiments, the replacement space R is outward from the bonding space B.

Those skilled in the art will recognize improvements and modifications to the preferred embodiments of the present disclosure. All such improvements and modifications are considered within the scope of the concepts disclosed herein and the claims that follow.

What is claimed is:

1. A window subassembly for a vehicle, comprising:
a window;

a bonding agent attached to an internal surface of the window and proximate to an edge of the window, the bonding agent configured to attach the window to a window mount of a vehicle; and a bonded window trim engaged with the edge of the window, the bonded window trim having an external portion contacting an external surface of the window and an internal portion contacting the internal surface of the window, the bonded window trim comprising a bonded trim lip extending downward and inward from a bottom internal edge of the internal portion of the bonded window trim, wherein the bonded window trim is configured to, upon attachment of the window to the window mount, preserve a replacement space of the window mount from the bonding agent for roped installation of a replacement window;

wherein the bonded trim lip is configured to deform to a configuration parallel with the internal surface of the window upon attachment of the window to the window mount to preserve the replacement space.

2. The window subassembly of claim 1, wherein the a bonded trim lip extends away from the internal surface of the window to contact the window mount before the bonding agent spreads to the replacement space upon attachment of the window to the window mount.

3. The window subassembly of claim 1, wherein the bonded trim lip is resilient and extends away from the internal surface of the window.

4. The window subassembly of claim 1, wherein the internal portion of the bonded window trim comprises a spacing length configured to preserve the replacement space.

5. The window subassembly of claim 1, wherein the bonded window trim is configured to preserve the replacement space having a length between 5-15 mm.

6. The window subassembly of claim 1, wherein the bonding agent comprises a pyramidal shape having a base between 5-15 mm and a height between 5-15 mm.

7. A window subassembly for a vehicle, comprising:
a window; and
a roped window trim engaged with an edge of the window, the roped window trim having an external portion contacting an external surface of the window, an intermediate portion contacting an internal surface of the window, and an internal portion configured to contact an internal surface of a window mount,
wherein the roped window trim comprises a roped trim lip that extends away from the internal surface of the window to contact with window mount and that is configured to deform to a configuration parallel with the internal surface of the window upon attachment of the window to the window mount to create a seal between the roped window trim and the window mount; and
wherein the roped window trim is configured to, upon attachment of the window to the window mount, create a seal in a replacement space of the window mount and not create a seal in a bonding space of the window mount.

8. The window subassembly of claim 7, wherein the roped trim lip is resilient and extends away from the internal surface of the window.

9. The window subassembly of claim 7, wherein the roped window trim defines a recess between the roped trim lip and an inward edge of the intermediate portion to create a gap between the window mount and the intermediate portion of the roped window trim upon attachment of the window to the window mount.

10. The window subassembly of claim 9, wherein the gap is larger than 1 mm to avoid contact with any residual bonding agent, the residual bonding agent being less than 1 mm thick.

11. The window subassembly of claim 7, wherein the replacement space is outward from the bonding space.

12. The window subassembly of claim 11, wherein the replacement space is between 5-15 mm wide.

13. A vehicle comprising:
a vehicle body comprising a window mount with a flange, the flange comprising a bonding space and a replacement space; and
a window subassembly comprising:
a window; and
a window trim engaged with an edge of the window, the window trim comprising a trim lip that extends away from the internal surface of the window and that is configured to deform to a configuration parallel with the internal surface of the window upon attachment of the window to the window mount to create a seal between the roped window trim and the window mount;
wherein the bonding space is configured for bonded installation of the window, and the replacement space is configured for roped installation of a replacement window.

14. The vehicle of claim 13, wherein the flange has a length between 25-35 mm.

15. The vehicle of claim 13, wherein the bonding space and the replacement space each have a length between 5-15 mm.

16. The vehicle of claim 13, further comprising
a bonding agent attached to an internal surface of the window and proximate to an edge of the window, the bonding agent attaching the window to the window mount;
wherein the window trim is a bonded window trim an external portion contacting an external surface of the window and an internal portion contacting an internal surface of the window, and
wherein the bonded window trim preserves the replacement space of the window mount from the bonding agent for the roped installation of the replacement window.

17. The vehicle of claim 13,
wherein the window trim is a roped window trim having an external portion contacting an external surface of the window, an intermediate portion contacting an internal surface of the window, and an internal portion configured to contact an internal surface of the window mount, and
wherein the roped window trim creates a seal in the replacement space of the window mount and does not create a seal in the bonding space of the window mount.

* * * * *